US012712699B2

(12) United States Patent
Sun et al.

(10) Patent No.: US 12,712,699 B2
(45) Date of Patent: Aug. 18, 2026

(54) TCI STATE DETERMINING METHOD AND APPARATUS, TERMINAL, AND NETWORK-SIDE DEVICE

(71) Applicant: VIVO MOBILE COMMUNICATION CO., LTD., Guangdong (CN)

(72) Inventors: Rongrong Sun, Guangdong (CN); Yu Yang, Guangdong (CN); Yang Song, Guangdong (CN); Peng Sun, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 210 days.

(21) Appl. No.: 18/413,736

(22) Filed: Jan. 16, 2024

(65) Prior Publication Data

US 2024/0154773 A1 May 9, 2024

Related U.S. Application Data

(63) Continuation of application No. PCT/CN2022/105537, filed on Jul. 13, 2022.

(30) Foreign Application Priority Data

Jul. 16, 2021 (CN) ......................... 202110808717.9

(51) Int. Cl.
*H04L 5/00* (2006.01)

(52) U.S. Cl.
CPC .......... *H04L 5/0091* (2013.01); *H04L 5/0035* (2013.01); *H04L 5/0051* (2013.01)

(58) Field of Classification Search
None
See application file for complete search history.

(56) References Cited

U.S. PATENT DOCUMENTS

2019/0297603 A1* 9/2019 Guo ...................... H04L 5/0051
2022/0159703 A1 5/2022 Kim et al.
2022/0224482 A1* 7/2022 Kim ...................... H04W 56/00
2022/0225359 A1* 7/2022 Kim .................. H04W 72/0453
2022/0239433 A1 7/2022 Kim et al.
2024/0291617 A1* 8/2024 Li ........................ H04B 7/0696

FOREIGN PATENT DOCUMENTS

CN 112583558 A 3/2021
WO 2020204347 A1 10/2020
WO 2020222606 A1 11/2020

(Continued)

OTHER PUBLICATIONS

Extended European Search Report for Application No. 22841434.8, dated Sep. 26, 2024, 11 Pages.

(Continued)

*Primary Examiner* — Fadi Haj Said
(74) *Attorney, Agent, or Firm* — Perilla Knox & Hildebrandt; Kenneth A. Knox

(57) ABSTRACT

A TCI state determining method and apparatus, a terminal, and a network-side device are provided. The TCI state determining method in the embodiments of this application includes: receiving, by a terminal, a first command; and determining, by the terminal, the number of TCI states applicable for a target resource based on the first command.

20 Claims, 5 Drawing Sheets

200

A terminal receives a first command ~ S202

↓

The terminal determines, based on the first command, the number of TCI states applicable for a target resource ~ S204

(56) References Cited

FOREIGN PATENT DOCUMENTS

| | | | |
|---|---|---|---|
| WO | 2021066622 | A1 | 4/2021 |
| WO | 2021066630 | A1 | 4/2021 |

OTHER PUBLICATIONS

ETSI "5G; NR; Physical layer procedures for data (3GPP TS 38.214 version 15.10.0 Release 15)" ETSI TS 138 214 V15.10.0 (Jul. 2020), 2020, 109 Pages.

MediaTek Inc. "Enhancement on multi-beam operation" 3GPP TSG RAN WG1 #105-e, e-Meeting, May 2021, R1-2105353, 28 Pages.

International Search Report and Written Opinion for Application No. PCT /CN2022/105537, dated Sep. 26, 2022, 8 Pages.

OPPO "Text proposals for enhancements on Multi-TRP and panel Transmission" 3GPP TSG RAN WG1 #100, e-Meeting, Feb. 2020, R1-2000457, 17 Pages.

First Office Action for CN Patent Application No. 202110808717.9 of May 10, 2025.

3GPP TSG RAN WG1 #105-e, R1-2106242, Summary#3 of AI: 8.1.2.4 Enhancements on HST-SFN deployment, e-Meeting, May 10-27, 2021. Source: Moderator (Intel Corporation). Document for Discussion and Decision.

3GPP TSG RAN WG1 #105-e, R1-2104205, Enhancement on multi-beam operation, e-Meeting, May 19-27, 2021. Source: Futurewei. Document for Discussion and Decision.

* cited by examiner

300

TCI STATE DETERMINING METHOD AND APPARATUS, TERMINAL, AND NETWORK-SIDE DEVICE

CROSS-REFERENCE TO RELATED APPLICATIONS

This application is a continuation of International Application No. PCT/CN2022/105537 filed on Jul. 13, 2022, which claims priority to a Chinese Patent Application No. 202110808717.9 filed on Jul. 16, 2021, which are incorporated herein by reference in their entireties.

TECHNICAL FIELD

This application pertains to the field of communications technology, and specifically relates to a transmission configuration indication (TCI) state determining method and apparatus, a terminal, and a network-side device.

BACKGROUND

New radio (NR) supports multiple transmission/reception points (multi-TRP)/multi-antenna panel (multi-panel) scenarios, to improve the reliability and throughput of transmission. In the downlink of a multi-TRP scenario, a terminal can receive the same or different data from multiple TRPs; in the uplink of a multi-TRP scenario, the terminal can send the same or different data to multiple TRPs.

For higher beam management efficiency and shorter beam update delay, a unified TCI framework can be used. That is, one set of beam indication information is used for both uplink and downlink transmissions. However, the unified TCI framework is specific to single-TRP scenarios, and multi-TRP scenarios are not considered therein. In this case, the terminal cannot determine whether a target resource is single-TRP transmission or multi-TRP transmission, which in turn prevents the transmission of the target resource and affects the communication effectiveness.

SUMMARY

Embodiments of this application provide a TCI state determining method and apparatus, a terminal, and a network-side device.

According to a first aspect, a TCI state determining method is provided, including: receiving, by a terminal, a first command; and determining, by the terminal, the number of TCI states applicable for a target resource based on the first command.

According to a second aspect, a TCI state determining method is provided, including: sending, by a network-side device, a first command; where the first command is used for a terminal to determine the number of TCI states applicable for a target resource.

According to a third aspect, a TCI state determining apparatus is provided, including: a receiving module, configured to receive a first command; and a determining module, configured to determine the number of TCI states applicable for a target resource based on the first command.

According to a fourth aspect, a TCI state determining apparatus is provided, including: a sending module, configured to send a first command, where the first command is used for a terminal to determine the number of TCI states applicable for a target resource.

According to a fifth aspect, a terminal is provided. The terminal includes a processor, a memory, and a program or instructions stored in the memory and capable of running on the processor. When the program or instructions are executed by the processor, the method according to the first aspect is implemented.

According to a sixth aspect, a terminal is provided, including a processor and a communication interface, where the processor is configured to determine the number of TCI states applicable for a target resource based on a first command, and the communication interface is configured to receive the first command.

According to a seventh aspect, a network-side device is provided. The network-side device includes a processor, a memory, and a program or instructions stored in the memory and capable of running on the processor. When the program or instructions are executed by the processor, the method according to the second aspect is implemented.

According to an eighth aspect, a network-side device is provided, including a processor and a communication interface. The communication interface is configured to send a first command, where the first command is used for a terminal to determine the number of TCI states applicable for a target resource.

According to a ninth aspect, a readable storage medium is provided. The readable storage medium stores a program or instructions. When the program or instructions are executed by a processor, the method according to the first aspect or the method according to the second aspect is implemented.

According to a tenth aspect, a chip is provided. The chip includes a processor and a communication interface, where the communication interface is coupled to the processor, and the processor is configured to run a program or instructions to implement the method according to the first aspect or the method according to the second aspect.

According to an eleventh aspect, a computer program/program product is provided. The computer program/program product is stored in a storage medium, and the program/program product is executed by at least one processor to implement the method according to the first aspect or the method according to the second aspect.

In the embodiments of this application, the terminal determines the number of TCI states applicable for the target resource based on the first command received.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first" and "second" are usually used to distinguish objects of a same type, and do not restrict the number of objects. For example, there may be one or a plurality of first objects. In addition, "and/or" in the specification and claims represents at least one of connected objects, and the character "/" generally indicates that the associated objects have an "or" relationship.

It should be noted that the technologies described in the embodiments of this application are not limited to long term evolution (LTE)/LTE-Advanced (LTE-A) systems, and may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (NR) system is described for an illustration purpose, and NR terms are used in most of the following descriptions, although these technologies may also be applied to other applications than the NR system application, for example, the 6th generation (6G) communications system.

Figure 1:
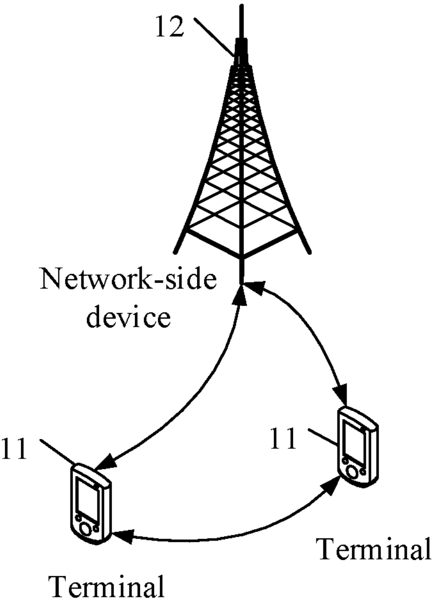
FIG. 1 is a schematic diagram of a wireless communications system according to an embodiment of this application.

FIG. 1 is a schematic diagram of a wireless communications system to which embodiments of this application are applicable. The wireless communications system includes a terminal 11 and a network-side device 12. The terminal 11 may also be referred to as a terminal device or user equipment (UE), and the terminal 11 may be a terminal-side device, such as a mobile phone, a tablet personal computer, a laptop computer or a notebook computer, a personal digital assistant (PDA), a palmtop computer, a netbook, an ultra-mobile personal computer (UMPC), a mobile Internet device (MID), an augmented reality (AR)/virtual reality (VR) device, a robot, a wearable device, vehicular user equipment (VUE), or pedestrian user equipment (PUE), a smart appliance (a home appliance with a wireless communication function, for example, a refrigerator, a television, a washing machine, or furniture). The wearable device includes a smart watch, a smart band, a smart earphone, smart glasses, smart jewelry (a smart bangle, a smart bracelet, a smart ring, a smart necklace, a smart ankle bangle, a smart anklet, or the like), a smart wristband, smart clothing, a game console, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a next generation NodeB (gNB), a home NodeB, a home evolved NodeB, a WLAN access point, a Wi-Fi node, a transmitting receiving point (TRP), or other appropriate terms in the art. Provided that the same technical effect is achieved, the base station is not limited to any specific technical terms. It should be noted that in the embodiments of this application, the base station in the NR system is merely used as an example, and a specific type of the base station is not limited.

The following describes in detail the transmission configuration indication (TCI) state determining method and apparatus, a terminal, and a network-side device provided in the embodiments of this application by using some embodiments and application scenarios thereof with reference to the accompanying drawings.

Figure 2:
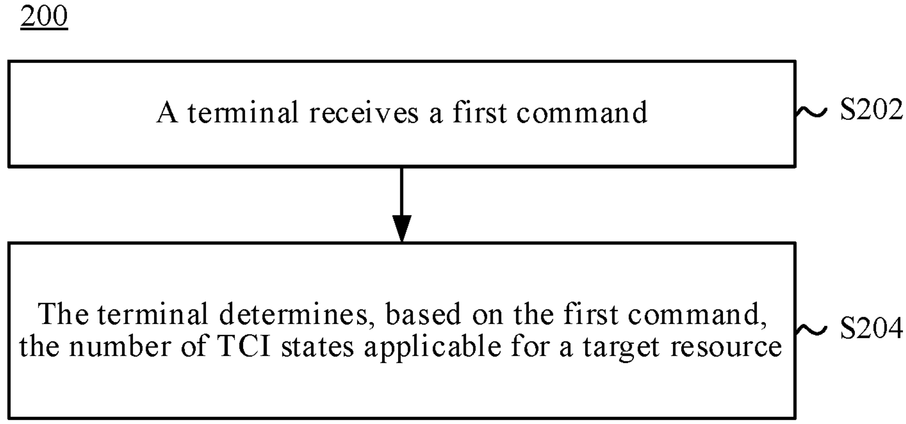
FIG. 2 is a schematic flowchart of a TCI state determining method according to an embodiment of this application.

As shown in FIG. 2, an embodiment of this application provides a TCI state determining method 200. The method may be executed by a terminal. That is, the method may be executed by software or hardware installed on the terminal. The method includes the following steps.

S202. A terminal receives a first command.

In this embodiment, the first command may be a radio resource control (RRC) command, a media access control-control element (MAC CE) command, a downlink control information (DCI) command, or the like.

The first command may be used to indicate a TCI state profile applicable for a target resource, and the TCI state profile may be used to indicate or represent a (maximum) number of TCI states applicable for the target resource. For example, the first command directly indicates the number of TCI states applicable for the target resource. For another example, the first command has a plurality of indicator fields each corresponding to one TRP. Based on the indicated values (for example, whether a TPR is available or unavailable) of these indicator fields, the terminal can determine the number of TCI states applicable for the target resource.

In this embodiment, in a case that the number of TCI states applicable for the target resource is equal to one, it usually means that single-TRP transmission may be used for the target resource; in a case that the number of TCI states applicable for the target resource is greater than one, it usually means that multi-TRP (or MTRP) transmission may be used for the target resource, and usually one TCI state may correspond to one TRP.

Optionally, the first command may further be used to indicate the number of TCI states applicable for a target resource scheduled by a scheduling command in a different format (for example, a DCI format). For example, the first command indicates that the number of TCI states applicable for a target resource scheduled by DCI in a first DCI format is equal to one, the first command indicates that the number of TCI states applicable for a target resource scheduled by DCI in a second DCI format is greater than one, and so on.

Optionally, the first command is associated with the target resource. In a case that the target is a control resource set (CORESET), the granularity of association may be per CORESET; in a case that the target resource is a physical uplink control channel (PUCCH), the granularity of association may be per PUCCH resource. The foregoing association relationship may be explicitly configured in the target resource configuration, or the terminal may implicitly derive the first command from other configuration of the target resource.

The number of TCI states applicable for a target resource can be determined by the terminal based on the TCI state profile indicated by the first command, in combination with the target resource determined based on the association relationship between the first command and the target resource.

S204. The terminal determines the number of TCI states applicable for a target resource based on the first command.

The target resource mentioned in various embodiments of this application may include at least one of the following: a physical downlink control channel (PDCCH), a CORESET, a search space (SS), a physical downlink shared channel (PDSCH), a PUCCH, a physical uplink shared channel (PUSCH), a channel state information-reference signal (CSI-RS), a sounding reference signal (SRS) resource, or an SRS resource set.

In this embodiment, the terminal may determine that one TCI state can be applied for the target resource, usually meaning that single-TRP transmission may be used for the target resource; or the terminal may determine that a plurality of TCI states can be applied for the target resource, usually meaning that multi-TRP (MTRP) transmission may be used for the target resource.

Optionally, the first command may further be used to indicate whether one or more TCI states can be applied for multiple TRPs. In this case, the terminal may further determine whether a TCI state can be applied for multiple TRPs, based on the first command.

In the TCI state determining method provided in the embodiment of this application, the terminal determines the number of TCI states applicable for the target resource based on the first command received. This allows the terminal to determine whether the target resource supports single-TRP transmission or multi-TRP transmission, helping achieve flexible transmission of the target resource and improve the communication effectiveness.

The TCI state determining method provided in the embodiment of this application can be applied in a unified TCI framework, so that multi-TRP or single-TRP operation on a channel or signal (namely, the target resource) can be flexibly indicated. In the unified TCI framework, a set of beam indication information is used for both uplink and downlink transmissions of the terminal. For example, one scheme is that one beam is used for both uplink and downlink. When DCI indicates one TCI state, all channels and/or signals in the uplink and downlink use that TCI state (called a joint TCI state). The other scheme is that DCI indicates a pair of beams, that is, two TCI states, one for downlink channels or signals and the other for uplink channels or signals. The two TCI states may be referred to as separate TCI states.

The joint indication mentioned in various embodiments of this application may be that a unified set of beam indication information (for example, a joint TCI state) is used for both uplink and downlink transmissions of the terminal. The separate indication mentioned in various embodiments of this application may be that DCI indicates a pair of beams, that is, two separate TCI states, one for downlink channels or signals and the other for uplink channels or signals.

In a multi-TRP scenario, a plurality of joint TCI states may be indicated for the terminal or the target resource, and each joint TCI state corresponds to one TRP; a plurality of groups of separate TCI states may be indicated for the terminal or the target resource, and each group of separate TCI states corresponds to one TRP.

Optionally, on the basis of embodiment 200, in a case that the terminal determines that one TCI state is applicable for the target resource, the method further includes: receiving, by the terminal, a second command; and determining, by the terminal, a TCI state to be applied for transmission of the target resource, based on the second command.

In this embodiment, the second command may be used to indicate the TCI state to be applied for transmission of the target resource, and the second command may be a DCI command.

In one example, the second command indicates one or a plurality of joint TCI states. The determining a TCI state to be applied for transmission of the target resource, based on the second command includes: in a case that the second command indicates one joint TCI state, using the one joint TCI state as the TCI state to be applied for transmission of the target resource; or in a case that the second command indicates a plurality of joint TCI states, using a first target joint TCI state among the plurality of joint TCI states, as the TCI state to be applied for transmission of the target resource.

In this example, the first target joint TCI state may be the first joint TCI state, the last joint TCI state, or the like among the plurality of joint TCI states indicated by the second command.

In another example, the second command indicates a plurality of downlink TCI states and/or a plurality of uplink TCI states. The determining a TCI state to be applied for transmission of the target resource, based on the second command includes: in a case that the target resource is a downlink resource, using a first target downlink TCI state among the plurality of downlink TCI states, as the TCI state to be applied for transmission of the target resource; or in a case that the target resource is an uplink resource, using a first target uplink TCI state among the plurality of uplink TCI states, as the TCI state to be applied for transmission of the target resource.

In this example, the first target downlink TCI state may be the first downlink TCI state, the last downlink TCI state, or the like of the plurality of downlink TCI states indicated by the second command; the first target uplink TCI state may be the first uplink TCI state, the last uplink TCI state, or the like of the plurality of uplink TCI states indicated by the second command.

The downlink resource mentioned in this example may be resource sent by a network-side device to the terminal, for example, PDCCH resource, PDSCH resource, and CSI-RS resource; the uplink resource mentioned in this example may be resource sent by the terminal to the network-side device, for example, PUCCH resource, PUSCH resource, SRS resource, and SRS resource set.

Optionally, on the basis of embodiment 200, in a case that the terminal determines that a plurality of TCI states are applicable for the target resource, the method further includes: receiving, by the terminal, a third command; and determining a TCI state to be applied for transmission of the target resource, based on the third command.

In this embodiment, the third command may be used to schedule transmission of the target resource, and the third command may be a DCI command. Optionally, the second command and the third command may be carried in the same DCI.

Optionally, the third command contains a first indicator field, and the first indicator field is used to indicate, from the plurality of TCI states indicated for the target resource, one of the following:

1) one TCI state to be applied for transmission of the target resource;
2) a plurality of TCI states to be applied for transmission of the target resource; and 3) an order of a plurality of TCI states to be applied for transmission of the target resource.

In one example, the first indicator field is used to indicate the foregoing 1). In another example, the first indicator field is used to indicate the foregoing 2) and 3). In yet another example, the first indicator field is used to indicate the foregoing 2). In still yet another example, the first indicator field is used to indicate the foregoing 3).

In this embodiment, the first indicator field is set, so as to achieve flexible switching between single-TRP and multi-TRP and thereby improve the flexibility of target resource transmission. For example, the first command indicates that multiple TRPs can be used for the target resource. That is, a multi-TRP scenario is applicable. Subsequently however, the network-side device can still use the first indicator field in the third command to indicate 1) one TCI state to be applied for transmission of the target resource. In this way, multi-TRP is switched to single-TRP. On the contrary, the first command indicates that a single TRP can be used for the target resource. That is, a single-TRP scenario is applicable. Subsequently however, the network-side device can still use the first indicator field in the third command to indicate 2) a plurality of TCI states to be applied for transmission of the target resource and/or 3) an order of a plurality of TCI states to be applied for transmission of the target resource. In this way, single-TRP is switched to multi-TRP.

In one example, the first indicator field in the third command may be of 1 bit, where 0 indicates that the first TCI state among the plurality of TCI states indicated for the target resource is applied for transmission of the target resource, and 1 indicates that a plurality of TCI states are applied.

In one example, the first indicator field in the third command may be of 2 bits, where 00 indicates that the first TCI state among the plurality of TCI states indicated for the target resource is used for transmission of the target resource, 01 indicates that the second TCI state among the plurality of TCI states indicated for the target resource is used for transmission of the target resource, 10 indicates that the first TCI state and the second TCI state indicated for the target resource are used for transmission of the target resource, and 11 indicates that the second TCI state and the first TCI state indicated for the target resource are used for transmission of the target resource.

The plurality of TCI states indicated for the target resource may be a plurality of TCI states indicated for the target resource by using the second command. Optionally, the second command and the third command may be carried in the same DCI, and the third command may be used to schedule transmission of the target resource. In addition, the first TCI state and the second TCI state indicated for the target resource are applied for transmission of the target resource. For example, the target resource is a PUSCH, and the PUSCH includes four transmissions in slot 1, slot 2, slot 3, and slot 4 respectively. The first TCI state may be applied for PUSCH transmission in slot 1 and slot 3, and the second TCI state may be applied for PUSCH transmission in slot 2 and slot 4. Alternatively, the first TCI state may be applied for PUSCH transmission in slot 1 and slot 2, and the second TCI state may be applied for PUSCH transmission in slot 3 and slot 4, and so on.

Optionally, the method further includes: determining, by the terminal, that the third command contains the first indicator field, in at least one of the following cases:

1) upper-layer signaling configures that the third command contains the first indicator field, for example, RRC signaling configures whether the first indicator field is present; or
2) the number of TCI states applicable for the target resource as determined based on the first command is greater than one. It can be understood that in other embodiments, in a case that the number of TCI states applicable for the target resource is equal to one based on the first command, the terminal may determine that the third command does not contain the first indicator field. This embodiment helps the terminal determine a size of the third command, facilitating successful demodulation of the third command and improving the communication efficiency.

Optionally, after the receiving, by the terminal, a third command, the determining a TCI state to be applied for transmission of the target resource, based on the third command includes: in a case that the third command is in a first format, using a first target TCI state, among the TCI states indicated for the target resource, as the TCI state to be applied for transmission of the target resource.

The TCI states herein indicated for the target resource may be the TCI states indicated for the target resource by using the second command.

In this embodiment, for example, if the third command is DCI format 1_0 or DCI format 0_0, the scheduled target resource can only use a predetermined TCI state, which may be the first TCI state among a plurality of TCI states indicated to the terminal.

Optionally, on the basis of embodiment 200, in a case that the terminal determines that a plurality of TCI states are applicable for the target resource, the terminal may further receive a second command, where the second command indicates a plurality of TCI states for the terminal or the target resource. In a case that a plurality of TCI states are applicable for the target resource, the embodiment 200 further includes at least one of the following:

1) in a case that the target resource is a PDCCH, determining a TCI state to be applied for transmission of the PDCCH from the plurality of TCI states indicated by the second command, based on an identifier of a search space associated with the PDCCH;
2) in a case that the target resource is a PDCCH, determining a TCI state to be applied for transmission of the PDCCH from the plurality of TCI states indicated by the second command, based on an identifier of a control resource set associated with a search space associated with the PDCCH.

Optionally, the plurality of TCI states indicated by the second command include a first TCI state and a second TCI state, and the search space includes a first search space and a second search space. The determining a TCI state to be applied for transmission of the PDCCH from the plurality of TCI states indicated by the second command as mentioned in 1) includes: applying the first TCI state for a PDCCH transmitted through the first search space, and applying the second TCI state for a PDCCH transmitted through the second search space.

Optionally, the plurality of TCI states indicated by the second command include a first TCI state and a second TCI state, and the control resource set includes a first control resource set and a second control resource set. The determining a TCI state to be applied for transmission of the PDCCH from the plurality of TCI states indicated by the second command as mentioned in 2) includes: applying the first TCI state for a PDCCH transmitted through the first control resource set, and applying the second TCI state for a PDCCH transmitted through the second control resource set.

In this embodiment, for example, in a case that the second command indicates two joint TCI states: when the target resource is a PDCCH, a first joint TCI state is applied for the search space with a smaller identifier and a second joint TCI state is applied for the search space with a greater identifier, of the associated search spaces. Alternatively, a first joint TCI state is applied for the search space associated with a smaller CORESET identifier and a second joint TCI state is applied for the search space associated with a greater CORESET identifier.

In this embodiment, an association relationship between the search space and the PDCCH may be indicated by RRC signaling.

In this embodiment, for another example, in a case that the second command indicates two downlink (DL) TCI states and two uplink (UL) TCI states: when the target resource is a PDCCH, a first downlink TCI state is applied for the search space with a smaller identifier and a second downlink TCI state is applied for the search space with a greater identifier, of the associated search spaces. Alternatively, a first downlink TCI state is applied for the search space associated with a smaller CORESET identifier and a second downlink TCI state is applied for the search space associated with a greater CORESET identifier.

Optionally, on the basis of embodiment 200, in a case that the terminal determines that a plurality of TCI states are applicable for the target resource, the terminal may further receive a second command, where the second command indicates a plurality of TCI states for the terminal or the target resource. In a case that a plurality of TCI states are applicable for the target resource, the method further includes at least one of the following:

1) in a case that the target resource is a PUSCH and an SRS resource set used for transmission of the PUSCH is associated with a CSI-RS, determining a TCI state to be applied for transmission of the CSI-RS from the plurality of TCI states indicated by the second command, based on an identifier of the SRS resource set; or
2) in a case that the target resource is a PUSCH, determining a TCI state to be applied for transmission of the SRS resource set from the plurality of TCI states indicated by the second command, based on an identifier of an SRS resource set, where the SRS resource set is used for transmission of the PUSCH.

Optionally, the plurality of TCI states indicated by the second command include a first TCI state and a second TCI state, and the SRS resource set includes a first SRS resource set and a second SRS resource set. The determining a TCI state to be applied for transmission of the CSI-RS from the plurality of TCI states indicated by the second command, based on an identifier of the SRS resource set as mentioned in 1) includes: applying the first TCI state for a CSI-RS associated with the first SRS resource set, and applying the second TCI state for a CSI-RS associated with the second SRS resource set.

Optionally, the plurality of TCI states indicated by the second command include a first TCI state and a second TCI state, and the SRS resource set includes a first SRS resource set and a second SRS resource set. The determining a TCI state to be applied for transmission of the SRS resource set from the plurality of TCI states indicated by the second command, based on the identifier of an SRS resource set as mentioned in 2) includes: applying the first TCI state for the first SRS resource set, and applying the second TCI state for the second SRS resource set.

In this embodiment, for example, when the second command indicates two joint TCI states: in a case that the target resource is a PUSCH and an SRS resource set used for transmission of the PUSCH is associated with a CSI-RS, a plurality of TCI states are respectively applied for CSI-RSs associated with a plurality of SRS resource sets. A first joint TCI state is applied for the CSI-RS associated with the SRS resource set having a smaller SRS resource set identifier, and a second joint TCI state is applied for the CSI-RS associated with the SRS resource set having a greater SRS resource set identifier.

In this embodiment, for example, when the second command indicates two joint TCI states: in a case that the target resource is a PUSCH and a plurality of TCI states are respectively applied for a plurality of SRS resource sets used for transmission of the PUSCH, a first joint TCI state is applied for an SRS resource in the SRS resource set having a smaller SRS resource set identifier, and a second joint TCI state is applied for an SRS resource in the SRS resource set having a greater SRS resource set identifier.

In this embodiment, for another example, when the second command indicates two downlink (DL) TCI states and two uplink (UL) TCI states: in a case that the target resource is a PUSCH and an SRS resource set used for transmission of the PUSCH is associated with a CSI-RS, a plurality of downlink TCI states are respectively applied for CSI-RSs associated with a plurality of SRS resource sets. A first downlink TCI state is applied for the CSI-RS associated with the SRS resource set having a smaller SRS resource set identifier, and a second downlink TCI state is applied for the CSI-RS associated with the SRS resource set having a greater SRS resource set identifier. In this embodiment, for another example, when the second command indicates two downlink (DL) TCI states and two uplink (UL) TCI states: in a case that the target resource is a PUSCH and a plurality of TCI states are respectively applied for a plurality of SRS resource sets used for transmission of the PUSCH, a first uplink TCI state is applied for an SRS resource in the SRS resource set having a smaller SRS resource set identifier, and a second uplink TCI state is applied for an SRS resource in the SRS resource set having a greater SRS resource set identifier.

It should be noted that the first TCI state and the second TCI state mentioned in the foregoing embodiments may be a first TCI state and a second TCI state in code point information respectively, or may be a first TCI state and a second TCI state sorted according to identifiers of TCI states.

Likewise, the first joint TCI state and the second joint TCI state, the first uplink TCI state and the second uplink TCI state, as well as the first downlink TCI state and the second downlink TCI state mentioned in the foregoing embodiments may also be obtained depending on an order in the code point information or the identifiers of TCI states.

As mentioned in the foregoing embodiments, in the case that the terminal determines that a plurality of TCI states are applicable for the target resource, the terminal receives a third command, where the third command is used to schedule the target resource; and determines a TCI state to be applied for transmission of the target resource, based on the third command.

Optionally, before the receiving, by the terminal, a third command, the method further includes: determining a size of the third command based on a second command. As described in the foregoing embodiments, the second command is used to determine the TCI state to be applied for transmission of the target resource, and the third command is used to schedule transmission of the target resource. In this embodiment, the second command and the third command may be two pieces of independent signaling.

The determining a size of the third command based on a second command includes: determining, based on the second command, at least one of the following: whether a second indicator field is present in the third command; number of second indicator fields in the third command; or bit length (or the number of bits) of the second indicator field in the third command.

Optionally, the second indicator field includes at least one of the following: an SRS resource indicator (SRI) field, a transmitted precoding matrix indicator (TPMI) field, a transmit power control (TPC) field, a phase tracking reference signal (PTRS)-demodulation reference signal (DMRS) association field, or a dynamic switching indicator field (for details, refer to the first indicator field in the third command described in the foregoing embodiments).

This embodiment enables the terminal to determine a size of the third command, facilitating successful demodulation of the third command and improving the communication efficiency.

Optionally, the method according to the foregoing embodiments further includes the following step: receiving, by the terminal, a fourth command, where the fourth command is used to activate a TCI state to be applied for transmission of the target resource. Optionally, the fourth command may be a MAC CE command.

In this embodiment, the fourth command (for example, a MAC CE command) may be received prior to the second command (for example, DCI). Optionally, the fourth command and the first command may be carried in the same MAC CE command. Alternatively, the fourth command and the first command may be two independent commands, and the terminal receives the first command and then the fourth command.

In this embodiment, the method further includes: receiving, by the terminal, a fifth command. The fifth command is used to indicate at least one of the following: a resource pool of the TCI state, where the resource pool may contain a plurality of TCI states; a mode of the TCI state, where the mode of the TCI state includes joint indication or separate indication. Optionally, the fifth command may be received prior to the fourth command.

The joint indication mentioned in this embodiment may be that a unified set of beam indication information (for example, a joint TCI state) is used for both uplink and downlink transmissions of the terminal. The separate indication mentioned in this embodiment may be that DCI indicates a pair of beams, namely two TCI states, one for downlink channels or signals and the other for uplink channels or signals.

Optionally, in a two-TRP scenario, the mode of the TCI state specifically includes at least one of the following: 1) both TRPs correspond to joint indication; 2) both TRPs correspond to separate indication; 3) the first TRP corresponds to joint indication, and the second TRP corresponds to separate indication; or 4) the first TRP corresponds to separate indication, and the second TRP corresponds to joint indication.

Optionally, the resource pool of the TCI state and the mode of the TCI state are associated with a control resource set resource pool index (CORESETPoolIndex) (that is, associated with TRPs), and/or the resource pool of the TCI state is associated with the mode of the TCI state.

For example, the TCI state associated earlier with a code point corresponding to the fourth command corresponds to TRP1. That is, the TCI state corresponds to the TCI state resource pool and the TCI state indicating mode which are configured earlier. The TCI state associated later with a code point corresponding to the fourth command corresponds to TRP2. That is, the TCI state corresponds to the TCI state resource pool and the TCI state indicating mode which are configured later.

Optionally, the TCI state indicating mode and/or the TCI state resource pool is associated with a DCI format.

Optionally, the fourth command includes code point information, where the code point information is used to indicate a TCI state to be activated by the code point information, and the code point information includes at least one of the following:

1) an identifier of the TCI state selected from a resource pool of the TCI state;
2) an identifier used for distinguishing uplink or downlink;
3) an identifier for distinguishing a TCI state group to which the TCI state belongs, where one TCI state group corresponds to one TRP; or
4) a mode of the TCI state; where the mode of the TCI state includes joint indication or separate indication. For example, 2-bit indication: joint indication, downlink of separate indication or uplink of separate indication, and the like.

Optionally, after the receiving, by the terminal, a fourth command (for example, a MAC CE), the method further includes: receiving, by the terminal, a second command (for example, DCI); where the second command is used to determine a TCI state to be applied for transmission of the target resource, and a TCI field in the second command corresponds to a target code point in the fourth command.

Optionally, the second command contains one TCI field, and the one TCI field corresponds to the target code point in the one fourth command.

Optionally, the second command contains one TCI field, and the one TCI field corresponds to target code points in a plurality of (for example, two) fourth commands. Optionally, TCI states activated by a plurality of fourth commands have different indication modes.

Optionally, the second command contains a plurality of TCI fields, and the plurality of TCI fields each correspond to the target code point information in the one fourth command. For example, the second command contains two TCI fields with their values each mapped to one piece of code point information in one fourth command.

In order to describe in detail the TCI state determining method provided in the embodiments of this application, the following provides a description with reference to several specific embodiments.

Embodiment 1

In this embodiment, the network side respectively configures whether two TCI states are applied simultaneously for transmission of the target resource scheduled by DCI formats 1_1, 1_2, 0_1, and 0_2 (corresponding to the third command in the foregoing embodiment). When the network side configures that DCI format 1_1 schedules two TCI states and DCI 1_2 schedules one TCI state, the PDSCH scheduled by DCI format 1_1 can use two TCI states, and the PDSCH scheduled by DCI format 1_2 can use only one TCI state.

Embodiment 2

In this embodiment, upper-layer signaling (corresponding to the first command in the foregoing embodiment) configures that PDSCH transmission can be associated with only one TCI state, and PUSCH transmission can be associated with two TCI states.

When the DCI (corresponding to the second command in the foregoing embodiment) indicates two TCI states, the first TCI state is applied for PDSCH transmission, and the TCI state to be applied for PUSCH transmission is indicated by the dynamic switching indicator field in the DCI (corresponding to the indicator field in the third command in the foregoing embodiment, where the third command and the second command are carried in the same DCI):

00 represents application of the first TCI state; 01 represents application of the second TCI state; 10 represents application of two TCI states, where the transmission order is the first TCI state followed by the second TCI state; 11 represents application of two TCI states, where the transmission order is the second TCI state followed by the first TCI state.

Embodiment 3

In this embodiment, the CORESET (corresponding to the target resource in the foregoing embodiment) is configured to be associated with a command (corresponding to the first command in the foregoing embodiment), where the command indicates whether one TCI state or two TCI states are applied for the CORESET.

The foregoing describes in detail a TCI state determining method according to an embodiment of this application with reference to FIG. 2. The following describes in detail a TCI state determining method according to another embodiment of this application with reference to FIG. 3. It can be understood that interaction between a network-side device and a terminal described from the perspective of the network-side device is the same as the description from the perspective of the terminal side in the method shown in FIG. 2, and therefore related description is appropriately omitted to avoid repetition.

Figure 3:
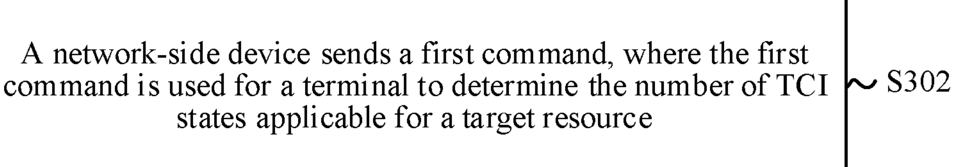
FIG. 3 is a schematic flowchart of a TCI state determining method according to an embodiment of this application.

FIG. 3 is a schematic diagram of an implementation process of a TCI state determining method according to an embodiment of this application, which may be applied to the network-side device. As shown in FIG. 3, the method 300 includes the following steps.

S302. A network-side device sends a first command, where the first command is used for a terminal to determine the number of TCI states applicable for a target resource.

In the embodiment of this application, the network-side device sends the first command, and the first command is used for the terminal to determine the number of TCI states applicable for the target resource. This allows the terminal to determine whether the target resource supports single-TRP transmission or multi-TRP transmission, helping achieve flexible transmission of the target resource and improve the communication effectiveness.

Optionally, as an embodiment, the first command is used for the terminal to determine that one TCI state is applicable for the target resource, and the method further includes: sending, by the network-side device, a second command, where the second command is used for the terminal to determine a TCI state to be applied for transmission of the target resource.

Optionally, as an embodiment, the first command is used for the terminal to determine that a plurality of TCI states are applicable for the target resource, and the method further includes: sending, by the network-side device, a third command, where the third command is used to schedule transmission of the target resource, and the third command is further used for the terminal to determine a TCI state to be applied for transmission of the target resource.

Optionally, as an embodiment, the third command contains an indicator field, where the indicator field is used to indicate, from a plurality of TCI states indicated for the target resource, one of the following: one TCI state to be applied for transmission of the target resource; a plurality of TCI states to be applied for transmission of the target resource; and an order of a plurality of TCI states to be applied for transmission of the target resource.

Optionally, as an embodiment, the method further includes: sending, by the network-side device, a fourth command, where the fourth command is used to activate a TCI state to be applied for transmission of the target resource.

Optionally, as an embodiment, the method further includes: sending, by the network-side device, a fifth command, where the fifth command is used to indicate at least one of the following: a resource pool of the TCI state or a mode of the TCI state; where the mode of the TCI state includes joint indication or separate indication.

Optionally, as an embodiment, after the sending, by the network-side device, a fourth command, the method further includes: sending, by the network-side device, a second command, where the second command is used for the terminal to determine a TCI state to be applied for transmission of the target resource, and a TCI field in the second command corresponds to a target code point in the fourth command.

Optionally, as an embodiment, the first command satisfies at least one of the following: the first command is used to indicate a maximum number of TCI states applicable for the target resource; the first command is used to indicate a TCI state profile applicable for the target resource scheduled by a third command in different formats; or the first command is associated with the target resource.

It should be noted that the TCI state determining method in this embodiment of this application may be performed by a TCI state determining apparatus or a control module for performing the TCI state determining method in the TCI state determining apparatus. The TCI state determining apparatus provided in an embodiment of this application is described by using an example in which the TCI state determining apparatus performs the TCI state determining method in the embodiments of this application.

Figure 4:
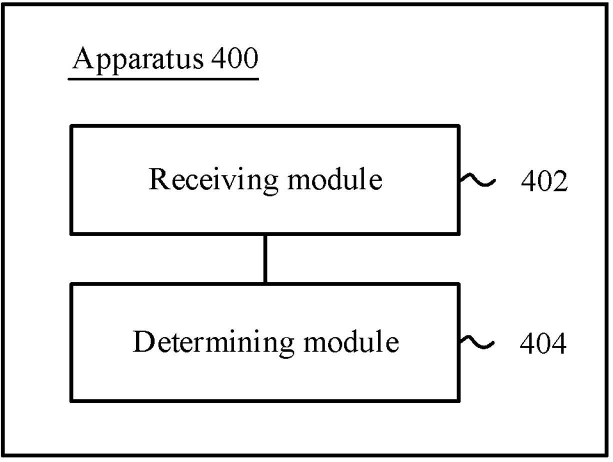
FIG. 4 is a schematic diagram of a structure of a TCI state determining apparatus according to an embodiment of this application.

FIG. 4 is a schematic diagram of a structure of a TCI state determining apparatus according to an embodiment of this application, and the apparatus may correspond to the terminal in other embodiments. As shown in FIG. 4, the apparatus 400 includes the following modules:

a receiving module 402, which may be configured to receive a first command; and a determining module 404, which may be configured to determine the number of TCI states applicable for a target resource based on the first command.

In an embodiment of this application, the apparatus 400 determines the number of TCI states applicable for the target resource based on the first command received. This allows the apparatus 400 to determine whether the target resource supports single-TRP transmission or multi-TRP transmission, helping achieve flexible transmission of the target resource and improve the communication effectiveness.

Optionally, as an embodiment, in a case that one TCI state is applicable for the target resource, the receiving module 402 may further be configured to receive a second command; and the determining module 404 may further be configured to determine the TCI state to be applied for transmission of the target resource, based on the second command.

Optionally, as an embodiment, the second command indicates one or a plurality of joint TCI states. The determining module 404 may be configured to: in a case that the second command indicates one joint TCI state, use the one joint TCI state as the TCI state to be applied for transmission of the target resource; or in a case that the second command indicates a plurality of joint TCI states, use a first target joint TCI state among the plurality of joint TCI states, as the TCI state to be applied for transmission of the target resource.

Optionally, as an embodiment, the second command indicates a plurality of downlink TCI states and/or a plurality of uplink TCI states. The determining module 404 may be configured to: in a case that the target resource is a downlink resource, use a first target downlink TCI state among the plurality of downlink TCI states, as the TCI state to be applied for transmission of the target resource; or in a case that the target resource is an uplink resource, use a first target downlink TCI state among the plurality of uplink TCI states, as the TCI state to be applied for transmission of the target resource.

Optionally, as an embodiment, in a case that a plurality of TCI states are applicable for the target resource, the receiving module 402 may further be configured to receive a third command, where the third command is used to schedule transmission of the target resource; and the determining module 404 may further be configured to determine the TCI state to be applied for transmission of the target resource, based on the third command.

Optionally, as an embodiment, the third command contains a first indicator field, where the first indicator field is used to indicate, from the plurality of TCI states indicated for the target resource, one of the following: one TCI state to be applied for transmission of the target resource; a plurality of TCI states to be applied for transmission of the target resource; and an order of a plurality of TCI states to be applied for transmission of the target resource.

Optionally, as an embodiment, the determining module 404 may further be configured to determine that the third command contains the first indicator field, in at least one of the following cases: upper-layer signaling configures that the third command contains the first indicator field; or the number of TCI states applicable for the target resource as determined based on the first command is greater than one.

Optionally, as an embodiment, the determining module 404 may be configured to: in a case that the third command is in a first format, use a first target TCI state, among the TCI states indicated for the target resource, as the TCI state to be applied for transmission of the target resource.

Optionally, as an embodiment, the second command indicates a plurality of TCI states. In a case that a plurality of TCI states are applicable for the target resource, the determining module 404 may further be configured for at least one of the following: in a case that the target resource is a PDCCH, determining a TCI state to be applied for transmission of the PDCCH from the plurality of TCI states indicated by the second command, based on an identifier of a search space associated with the PDCCH; or in a case that the target resource is a PDCCH, determining a TCI state to be applied for transmission of the PDCCH from the plurality of TCI states indicated by the second command, based on an identifier of a control resource set associated with a search space associated with the PDCCH.

Optionally, as an embodiment, the plurality of TCI states indicated by the second command include a first TCI state and a second TCI state, and the search space includes a first search space and a second search space. The determining a TCI state to be applied for transmission of the PDCCH from the plurality of TCI states indicated by the second command includes: applying the first TCI state for a PDCCH transmitted through the first search space, and applying the second TCI state for a PDCCH transmitted through the second search space. The control resource set includes a first control resource set and a second control resource set. The determining a TCI state to be applied for transmission of the PDCCH from the plurality of TCI states indicated by the second command includes: applying the first TCI state for a PDCCH transmitted through the first control resource set, and applying the second TCI state for a PDCCH transmitted through the second control resource set.

Optionally, as an embodiment, the second command indicates a plurality of TCI states. In a case that a plurality of TCI states are applicable for the target resource, the determining module 404 may further be configured for at least one of the following: in a case that the target resource is a PUSCH and a sounding reference signal SRS resource set used for transmission of the PUSCH is associated with a channel state information reference signal CSI-RS, determining a TCI state to be applied for transmission of the CSI-RS from the plurality of TCI states indicated by the second command, based on an identifier of the SRS resource set; or in a case that the target resource is a PUSCH, determining a TCI state to be applied for transmission of the SRS resource set from the plurality of TCI states indicated by the second command, based on an identifier of an SRS resource set, where the SRS resource set is used for transmission of the PUSCH.

Optionally, as an embodiment, the plurality of TCI states indicated by the second command include a first TCI state and a second TCI state, and the SRS resource set includes a first SRS resource set and a second SRS resource set. The determining a TCI state to be applied for transmission of the CSI-RS from the plurality of TCI states indicated by the second command, based on an identifier of the SRS resource set includes: applying the first TCI state for a CSI-RS associated with the first SRS resource set, and applying the second TCI state for a CSI-RS associated with the second SRS resource set. The determining a TCI state to be applied for transmission of the SRS resource set from the plurality of TCI states indicated by the second command, based on the identifier of an SRS resource set includes: applying the first TCI state for the first SRS resource set, and applying the second TCI state for the second SRS resource set.

Optionally, as an embodiment, the determining module 404 may further be configured to determine a size of the third command based on a second command; where the second command is used to determine a TCI state to be applied for transmission of the target resource.

Optionally, as an embodiment, the determining module 404 may be configured to determine, based on the second command, at least one of the following: whether a second indicator field is present in the third command; number of second indicator fields in the third command; or bit length of the second indicator field in the third command.

Optionally, as an embodiment, the second indicator field includes at least one of the following: an SRI field, a TPMI field, a TPC field, a PTRS-DMRS association field, or a dynamic switching indicator field.

Optionally, as an embodiment, the receiving module 402 may further be configured to receive a fourth command, where the fourth command is used to activate a TCI state to be applied for transmission of the target resource.

Optionally, as an embodiment, the receiving module 402 may further be configured to receive a fifth command, where the fifth command is used to indicate at least one of the following: a resource pool of the TCI state or a mode of the TCI state; where the mode of the TCI state includes joint indication or separate indication.

Optionally, as an embodiment, the resource pool of the TCI state and the mode of the TCI state are associated with a CORESETPoolIndex, and/or the resource pool of the TCI state is associated with the mode of the TCI state.

Optionally, as an embodiment, the fourth command includes code point information, where the code point information is used to indicate a TCI state to be activated by the code point information, and the code point information includes at least one of the following: an identifier of the TCI state selected from a resource pool of the TCI state; an identifier used for distinguishing uplink or downlink; an identifier for distinguishing a TCI state group to which the TCI state belongs; or a mode of the TCI state; where the mode of the TCI state includes joint indication or separate indication.

Optionally, as an embodiment, the receiving module 402 may further be configured to receive a second command; where the second command is used to determine the TCI state to be applied for transmission of the target resource, and a TCI field in the second command corresponds to target code point information in the fourth command.

Optionally, as an embodiment, the second command contains one TCI field, and the one TCI field corresponds to the target code point information in the one fourth command; the second command contains one TCI field, and the one TCI field corresponds to the target code point information in a plurality of fourth commands; or the second command contains a plurality of TCI fields, and the plurality of TCI fields each correspond to the target code point information in the one fourth command.

Optionally, as an embodiment, the first command satisfies at least one of the following: the first command is used to indicate a maximum number of TCI states applicable for the target resource; the first command is used to indicate a TCI state profile applicable for the target resource scheduled by a third command in different formats; or the first command is associated with the target resource.

Optionally, as an embodiment, the target resource includes at least one of the following: a PDCCH, a control resource set, a search space, a PDSCH, a PUCCH, a PUSCH, a CSI-RS, an SRS resource, or an SRS resource set.

For the apparatus 400 according to this embodiment of this application, reference may be made to the processes of the method 200 in the corresponding embodiment of this application, and the units/modules of the apparatus 400 and other operations and/or functions described above are respectively intended to implement the corresponding processes in the method 200, with the same or equivalent technical effects achieved. For brevity, details are not described herein again.

The TCI state determining apparatus in an embodiment of this application may be an apparatus or an apparatus or electronic device with an operating system, or may be a component, an integrated circuit, or a chip of a terminal. The apparatus or electronic device may be a mobile terminal or a non-mobile terminal. For example, the mobile terminal may include but is not limited to a type of the foregoing terminal 11, and the non-mobile terminal may be a server, a network attached storage (NAS), a personal computer (PC), a television (TV), a teller machine, a self-service machine, or the like. This is not specifically limited in the embodiments of this application.

The TCI state determining apparatus provided in this embodiment of this application can implement the processes implemented by the method embodiment illustrated in FIG. 2 and FIG. 3, with the same technical effects achieved. To avoid repetition, details are not described herein again.

Figure 5:
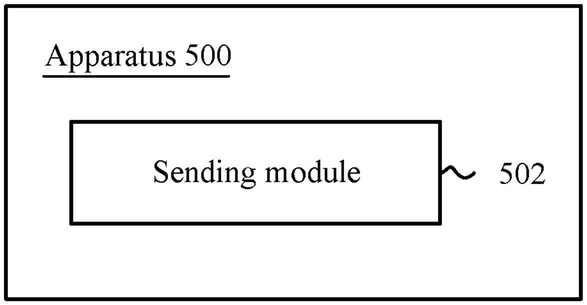
FIG. 5 is a schematic diagram of a structure of a TCI state determining apparatus according to an embodiment of this application.

FIG. 5 is a schematic diagram of a structure of a TCI state determining apparatus according to an embodiment of this application, and the apparatus may correspond to the network-side device in other embodiments. As shown in FIG. 5, the apparatus 500 includes the following modules:

- a sending module 502, which may be configured to send a first command, where the first command is used for a terminal to determine the number of TCI states applicable for a target resource.

In the embodiment of this application, the network-side device sends the first command, and the first command is used for the terminal to determine the number of TCI states applicable for the target resource. This allows the terminal to determine whether the target resource supports single-TRP transmission or multi-TRP transmission, helping achieve flexible transmission of the target resource and improve the communication effectiveness.

Optionally, as an embodiment, the first command is used for the terminal to determine that one TCI state is applicable for the target resource, and the sending module 502 may further be configured to send a second command, where the second command is used for the terminal to determine a TCI state to be applied for transmission of the target resource.

Optionally, as an embodiment, the first command is used for the terminal to determine that a plurality of TCI states are applicable for the target resource, and the sending module 502 may further be configured to send a third command, where the third command is used to schedule transmission of the target resource, and the third command is further used for the terminal to determine a TCI state to be applied for transmission of the target resource.

Optionally, as an embodiment, the third command contains an indicator field, where the indicator field is used to indicate, from a plurality of TCI states indicated for the target resource, one of the following: one TCI state to be applied for transmission of the target resource; a plurality of TCI states to be applied for transmission of the target resource; and an order of a plurality of TCI states to be applied for transmission of the target resource.

Optionally, as an embodiment, the sending module 502 may further be configured to send a fourth command, where the fourth command is used to activate a TCI state to be applied for transmission of the target resource.

Optionally, as an embodiment, the sending module 502 may further be configured to send a fifth command, where the fifth command is used to indicate at least one of the following: a resource pool of the TCI state or a mode of the TCI state; where the mode of the TCI state includes joint indication or separate indication.

Optionally, as an embodiment, the sending module 502 may further be configured to send a second command; where the second command is used for the terminal to determine the TCI state to be applied for transmission of the target resource, and a TCI field in the second command corresponds to a target code point in the fourth command.

Optionally, as an embodiment, the first command satisfies at least one of the following: the first command is used to indicate a maximum number of TCI states applicable for the target resource; the first command is used to indicate a TCI state profile applicable for the target resource scheduled by a third command in different formats; or the first command is associated with the target resource.

For the apparatus 500 according to this embodiment of this application, reference may be made to the processes of the method 300 in the corresponding embodiment of this application, and the units/modules of the apparatus 500 and other operations and/or functions described above are respectively intended to implement the corresponding processes in the method 300, with the same or equivalent technical effects achieved. For brevity, details are not described herein again.

Figure 6:
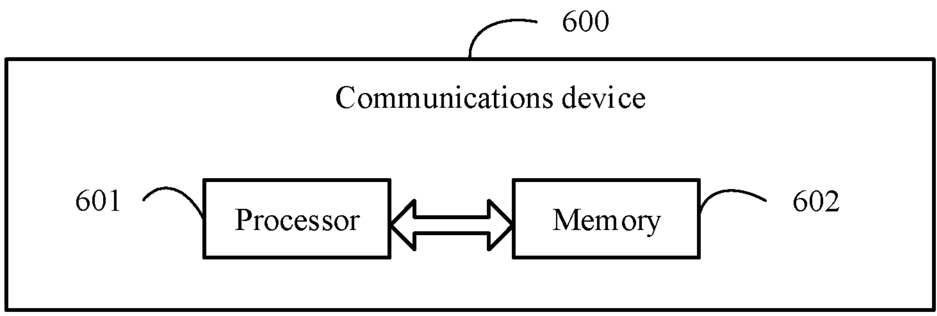
FIG. 6 is a schematic diagram of a structure of a communications device according to an embodiment of this application.

Optionally, as shown in FIG. 6, an embodiment of this application further provides a communications device 600, including a processor 601, a memory 602, and a program or instructions stored in the memory 602 and capable of running on the processor 601. For example, in a case that the communications device 600 is a terminal and the program or instructions are executed by the processor 601, the processes of the foregoing embodiments of the TCI state determining method are implemented, with the same technical effects achieved. In a case that the communications device 600 is a network-side device, when the program or instructions are executed by the processor 601, the processes in the forgoing embodiments of the TCI state determining method are implemented, with the same technical effects achieved. To avoid repetition, details are not described herein again.

Figure 7:
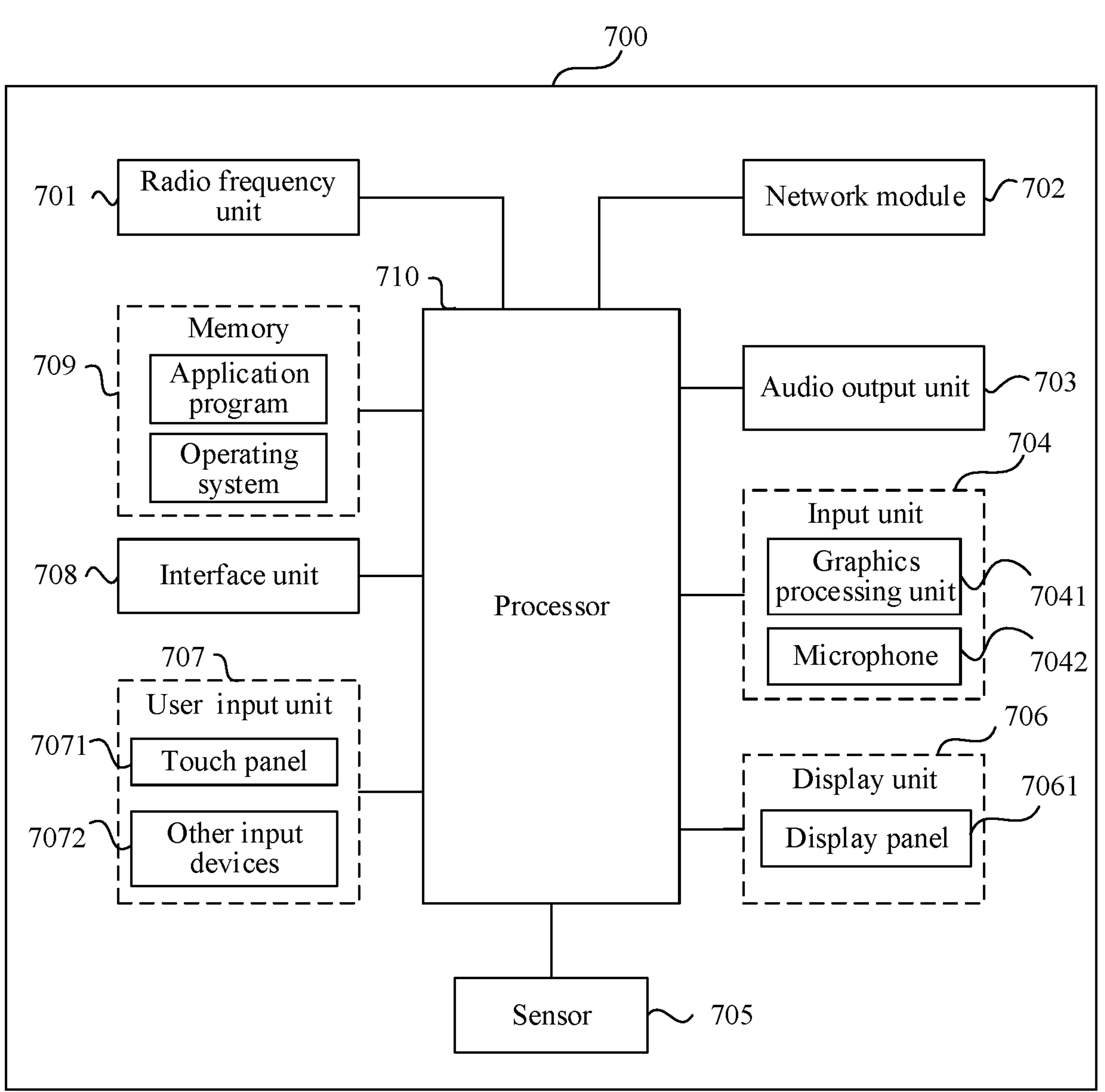
FIG. 7 is a schematic diagram of a structure of a terminal according to an embodiment of this application.

An embodiment of this application further provides a terminal including a process and a communication interface. The processor is configured to determine the number of TCI states applicable for a target resource based on a first command, and the communication interface is configured to receive the first command. The terminal embodiment is corresponding to the foregoing method embodiments used on the terminal side. All the implementation processes and implementation methods of the foregoing method embodiments can be applied to the terminal embodiment, with the same technical effects achieved. Specifically, FIG. 7 is a schematic diagram of a hardware structure of a terminal implementing the embodiments of this application.

A terminal 700 includes but is not limited to at least some components of a radio frequency unit 701, a network module 702, an audio output unit 703, an input unit 704, a sensor 705, a display unit 706, a user input unit 707, an interface unit 708, a memory 709, and a processor 710.

Persons skilled in the art can understand that the terminal 700 may further include a power source (for example, a battery) for supplying power to the components. The power source may be logically connected to the processor 710 through a power management system. In this way, functions such as charge management, discharge management, and power consumption management are implemented by using the power management system. The structure of the terminal shown in FIG. 7 does not constitute a limitation on the terminal. The terminal may include more or fewer components than illustrated in the figure, or combine some components, or have a different component arrangement. Details are not described again herein.

It should be understood that in the embodiments of this application, the input unit 704 may include a graphics processing unit (GPU) 7041 and a microphone 7042. The graphics processing unit 7041 processes image data of a static picture or a video that is obtained by an image capture apparatus (for example, a camera) in a video capture mode or an image capture mode. The display unit 706 may include a display panel 7061. The display panel 7061 may be configured in a form of a liquid crystal display, an organic light-emitting diode, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a functional button (such as a volume control button or a power on/off button), a trackball, a mouse, and a joystick. Details are not described again herein.

In the embodiments of this application, the radio frequency circuit 701 receives downlink data from the network-side device for processing by the processor 710, and sends uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions, and various data. The memory 709 may mainly include a program or instruction storage area and a data storage area. The program or instruction storage area may store an operating system, an application program or instructions required by at least one function (for example, an audio playing function and an image playing function), and the like. In addition, the memory 709 may include a high-speed random access memory, and may further include a non-transient memory. The non-transient memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one magnetic disk storage device, a flash storage device, or another non-transient solid-state storage device.

The processor 710 may include one or more processing units. Optionally, the processor 710 may integrate an application processor and a modem processor. The application processor mainly processes an operating system, a user interface, an application program or instructions, and the like. The modem processor mainly processes wireless communication, for example, a baseband processor. It should be understood that alternatively, the modem processor may not be integrated into the processor 710.

The radio frequency unit 701 may be configured to receive a first command.

The processor 710 may be configured to determine the number of transmission configuration indication TCI states applicable for a target resource based on the first command.

In an embodiment of this application, the terminal determines the number of TCI states applicable for the target resource based on the first command received. This allows the terminal to determine whether the target resource supports single-TRP transmission or multi-TRP transmission, helping achieve flexible transmission of the target resource and improve the communication effectiveness.

The terminal 700 provided in this embodiment of this application may further implement the processes of the foregoing embodiments of the TCI state determining method, with the same technical effects. To avoid repetition, details are not described herein again.

An embodiment of this application further provides a network-side device, including a processor and a communication interface. The communication interface is configured to send a first command, where the first command is used for a terminal to determine the number of TCI states applicable for a target resource. The network-side device embodiment is corresponding to the foregoing method embodiments applied to the network-side device. All the implementation processes and implementation methods of the foregoing method embodiments can be applied to the network-side device embodiment, with the same technical effects achieved.

Figure 8:
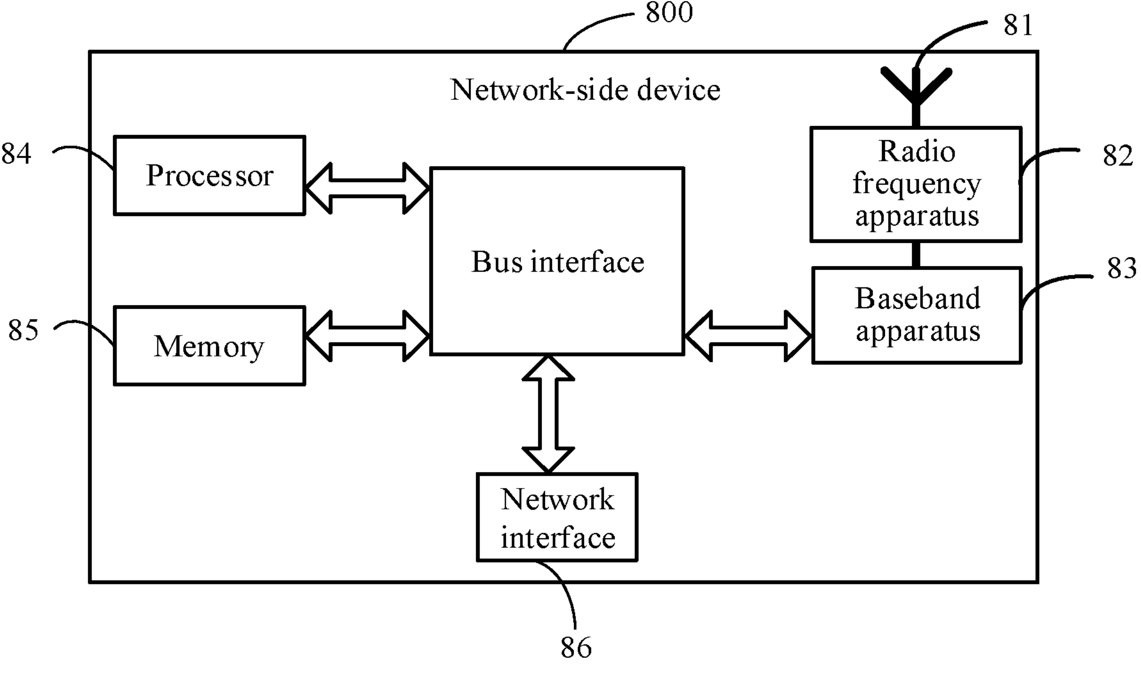
FIG. 8 is a schematic diagram of a structure of a network-side device according to an embodiment of this application.

Specifically, an embodiment of this application further provides a network-side device. As shown in FIG. 8, the network-side device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and transmits the received information to the baseband apparatus 83 for processing. In a downlink direction, the baseband apparatus 83 processes to-be-transmitted information, and transmits the information to the radio frequency apparatus 82; and the radio frequency apparatus 82 processes the received information and then transmits the information by using the antenna 81.

The frequency band processing apparatus may be located in the baseband apparatus 83. The method performed by the network-side device in the foregoing embodiments may be implemented in the baseband apparatus 83, and the baseband apparatus 83 includes a processor 84 and a memory 85.

The baseband apparatus 83 may include, for example, at least one baseband processing unit, where a plurality of chips are disposed on the baseband processing unit. As shown in FIG. 8, one of the chips is, for example, the processor 84, and connected to the memory 85, to invoke a program in the memory 85 to perform the operations of the network-side device shown in the foregoing method embodiment.

The baseband apparatus 83 may further include a network interface 86, configured to exchange information with the radio frequency apparatus 82, where the interface is, for example, a common public radio interface (CPRI).

Specifically, the network-side device according to the embodiment of this application further includes a program or instructions stored in the memory 85 and capable of running on the processor 84. The processor 84 invokes the program or instructions in the memory 85 to implement the method performed by each module shown in FIG. 5, and the same technical effects are achieved. To avoid repetition, details are not described herein again.

An embodiment of this application further provides a readable storage medium, where the readable storage medium stores a program or instructions, and when the program or instructions are executed by a processor, the processes of the foregoing embodiments of the TCI state determining method are implemented, with the same technical effects achieved. To avoid repetition, details are not described herein again.

The processor may be a processor in the terminal described in the foregoing embodiment. The readable storage medium includes a computer-readable storage medium, such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or an instruction to implement the processes of the foregoing embodiments of the TCI state determining method, with the same technical effects. To avoid repetition, details are not described herein again.

It should be understood that the chip mentioned in this embodiment of this application may also be referred to as a system-level chip, a system chip, a chip system, a system-on-chip, or the like.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a computer software product. The software product is stored in a storage medium (for example, a ROM/RAM, a magnetic disk, or an optical disc), and includes several instructions for instructing a terminal (which may be a mobile phone, a computer, a server, an air conditioner, a network-side device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A transmission configuration indication (TCI) state determining method, comprising:

receiving, by a terminal, a target resource configuration, wherein the target resource configuration indicates an association relationship between first commands and target resources, the target resource comprises a control resource set (CORESET) or a physical uplink control channel (PUCCH), and each first command is associated with a respective CORESET or a respective PUCCH; and determining, by the terminal, a number of TCI states applicable for the target resource associated with the first command, based on the first command.

2. The method according to claim 1, wherein in response to determining that only one TCI state is applicable for the target resource, the method further comprises:

receiving, by the terminal, a second command; and determining, by the terminal, a TCI state to be applied for transmission of the target resource, based on the second command.

3. The method according to claim 2, wherein the second command indicates one or a plurality of joint TCI states, and the determining, by the terminal, a TCI state to be applied for transmission of the target resource, based on the second command comprises:

in response to that the second command indicates one joint TCI state, using the one joint TCI state as the TCI state to be applied for transmission of the target resource; or in response to that the second command indicates a plurality of joint TCI states, using a first target joint TCI state among the plurality of joint TCI states, as the TCI state to be applied for transmission of the target resource.

4. The method according to claim 2, wherein the second command indicates a plurality of downlink TCI states and/or a plurality of uplink TCI states, and the determining, by the terminal, a TCI state to be applied for transmission of the target resource, based on the second command comprises:

in response to that the target resource is a downlink resource, using a first target downlink TCI state among the plurality of downlink TCI states, as the TCI state to be applied for transmission of the target resource; or in response to that the target resource is an uplink resource, using a first target uplink TCI state among the plurality of uplink TCI states, as the TCI state to be applied for transmission of the target resource.

5. The method according to claim 1, wherein in response to determining that a plurality of TCI states are applicable for the target resource, the method further comprises:

receiving, by the terminal, a third command, wherein the third command is used to schedule transmission of the target resource; and determining, by the terminal, a TCI state to be applied for transmission of the target resource, based on the third command;

wherein the third command contains a first indicator field, and the first indicator field is used to indicate, from the plurality of TCI states indicated for the target resource, one of the following one TCI state to be applied for transmission of the target resource;

a plurality of TCI states to be applied for transmission of the target resource; and an order of a plurality of TCI states to be applied for transmission of the target resource.

6. The method according to claim 5, wherein the method further comprises:

determining that the third command contains the first indicator field, in at least one of the following cases:

upper-layer signaling configures that the third command contains the first indicator field; or the number of TCI states applicable for the target resource as determined based on the first command is greater than one.

7. The method according to claim 5, wherein the determining a TCI state to be applied for transmission of the target resource, based on the third command comprises:

in response to that the third command is in a first format, using a first target TCI state, among the TCI states indicated for the target resource, as the TCI state to be applied for transmission of the target resource.

8. The method according to claim 1, wherein a second command indicates a plurality of TCI states, and in response to determining that a plurality of TCI states are applicable for the target resource, the method further comprises at least one of the following:

in response to that the target resource is a physical downlink control channel (PDCCH), determining a TCI state to be applied for transmission of the PDCCH from the plurality of TCI states indicated by the second command, based on an identifier of a search space associated with the PDCCH; or in response to that the target resource is a PDCCH, determining a TCI state to be applied for transmission of the PDCCH from the plurality of TCI states indicated by the second command, based on an identifier of the CORESET associated with a search space associated with the PDCCH.

9. The method according to claim 8, wherein the plurality of TCI states indicated by the second command comprise a first TCI state and a second TCI state, and the search space comprises a first search space and a second search space;

wherein the determining a TCI state to be applied for transmission of the PDCCH from the plurality of TCI states indicated by the second command comprises:

applying the first TCI state for a PDCCH transmitted through the first search space, and applying the second TCI state for a PDCCH transmitted through the second search space.

10. The method according to claim 8, wherein the plurality of TCI states indicated by the second command comprise a first TCI state and a second TCI state, and the CORESET comprises a first CORESET and a second CORESET;

wherein the determining a TCI state to be applied for transmission of the PDCCH from the plurality of TCI states indicated by the second command comprises:

applying the first TCI state for a PDCCH transmitted through the first CORESET, and applying the second TCI state for a PDCCH transmitted through the second CORESET.

11. The method according to claim 2, wherein a second command indicates a plurality of TCI states, and in response to determining that a plurality of TCI states are applicable for the target resource, the method further comprises at least one of the following:

in response to that the target resource is a PUSCH and a sounding reference signal (SRS) resource set used for transmission of the PUSCH is associated with a channel state information reference signal (CSI-RS), determining a TCI state to be applied for transmission of the CSI-RS from the plurality of TCI states indicated by the second command, based on an identifier of the SRS resource set; or in response to that the target resource is a PUSCH, determining a TCI state to be applied for transmission of the SRS resource set from the plurality of TCI states indicated by the second command, based on an identifier of an SRS resource set, wherein the SRS resource set is used for transmission of the PUSCH.

12. The method according to claim 5, wherein before the receiving, by the terminal, a third command, the method further comprises: determining, by the terminal, a size of the third command based on a second command; wherein the second command is used to determine a TCI state to be applied for transmission of the target resource.

13. The method according to claim 12, wherein the determining, by the terminal, a size of the third command based on a second command comprises:

determining, by the terminal based on the second command, at least one of the following:

whether a second indicator field is present in the third command;

number of second indicator fields in the third command; or bit length of the second indicator field in the third command.

14. The method according to claim 1, wherein the method further comprises:

receiving, by the terminal, a fourth command, wherein the fourth command is used to activate a TCI state to be applied for transmission of the target resource.

15. The method according to claim 1, wherein the method further comprises:

receiving, by the terminal, a fifth command, wherein the fifth command is used to indicate at least one of the following: a resource pool of the TCI state or a mode of the TCI state, wherein the mode of the TCI state comprises joint indication or separate indication.

16. A TCI state determining method, comprising:

sending, by a network-side device, a first target resource configuration, wherein the target resource configuration indicates an association relationship between first commands and target resources, the target resource comprises a control resource set (CORESET), or a physical uplink control channel (PUCCH), and each first command is associated with a respective CORESET or a respective PUCCH, wherein the first command is used for a terminal to determine a number of TCI states applicable for the target resource associated with the first command.

17. The method according to claim 16, wherein the first command is used for the terminal to determine that only one TCI state is applicable for the target resource, and the method further comprises:

sending, by the network-side device, a second command, wherein the second command is used for the terminal to determine a TCI state to be applied for transmission of the target resource.

18. The method according to claim 16, wherein the first command is used for the terminal to determine that a plurality of TCI states are applicable for the target resource, and the method further comprises:

sending, by the network-side device, a third command, wherein the third command is used to schedule transmission of the target resource, and the third command is further used for the terminal to determine a TCI state to be applied for transmission of the target resource; wherein the third command contains a first indicator field, and the first indicator field is used to indicate, from the plurality of TCI states indicated for the target resource, one of the following:

one TCI state to be applied for transmission of the target resource;

a plurality of TCI states to be applied for transmission of the target resource; and an order of a plurality of TCI states to be applied for transmission of the target resource.

19. A network-side device, comprising a processor implemented in hardware, a memory, and a program or instructions stored in the memory and executable by the processor, wherein when the program or instructions are executed by the processor, the TCI state determining method according to claim 16 is implemented.

20. A terminal, comprising a processor implemented in hardware, memory, and a program or instructions stored in the memory and capable of running on the processor, wherein when the program or instructions are executed by the processor, the processor is directed to:

receive, by the terminal, a target resource configuration, wherein the target resource configuration indicates an association relationship between first commands and target resources, the target resource comprises a control resource set (CORESET), or a physical uplink control channel (PUCCH), and each first command is associated with a respective CORESET or a respective PUCCH; and determine, by the terminal, a number of TCI states applicable for the target resource associated with the first command, based on the first command.

* * * * *